United States Patent [19]

Lynch et al.

[11] Patent Number: 4,785,178

[45] Date of Patent: Nov. 15, 1988

[54] DRY STORAGE IRRADIATOR STRUCTURE

[76] Inventors: Patrick A. Lynch, 667 E. Sequim Bay Rd., Sequim, Wash. 98382; Douglas Jones, 11618 - 20th SE., Everett, Wash. 98205; Robert Franklin, 31517 37th Ave. SW., Federal Way, Wash. 98003; James M. Cobb, 658 SW. 134th St., Seattle, Wash. 98146

[21] Appl. No.: 866,701

[22] Filed: May 27, 1986

[51] Int. Cl.$^4$ .............................................. G21F 5/02
[52] U.S. Cl. ............................ 250/497.1; 250/515.1; 250/454.1; 378/64
[58] Field of Search ............... 250/505.1, 506.1, 515.1, 250/522.1, 453.1, 454.1, 455.1, 497.1; 426/234, 240; 378/64, 68, 69; 376/909, 340, 341, 342

[56] References Cited

U.S. PATENT DOCUMENTS

| | | | |
|---|---|---|---|
| 2,769,921 | 11/1956 | Nahin | 378/64 |
| 3,133,197 | 5/1964 | Allen | 250/506 |
| 3,142,759 | 7/1964 | Jefferson et al. | 378/69 |
| 3,192,054 | 6/1965 | Kuhl et al. | 426/234 |
| 3,411,002 | 11/1968 | Armel | 378/69 |
| 3,417,239 | 12/1968 | Blache-Fraser | 250/423.1 |
| 3,527,645 | 9/1970 | Casalina | 426/240 |
| 3,564,241 | 2/1971 | Ludwig | 378/69 |
| 3,566,113 | 2/1971 | Balanca et al. | 250/515.1 |
| 3,676,675 | 7/1972 | Ransohoff et al. | 250/515.1 |

FOREIGN PATENT DOCUMENTS

| | | | |
|---|---|---|---|
| 0865914 | 3/1971 | Canada | 378/69 |
| 1094423 | 12/1967 | United Kingdom | 376/342 |

*Primary Examiner*—Bruce C. Anderson
*Assistant Examiner*—Paul A. Guss
*Attorney, Agent, or Firm*—Keith S. Bergman

[57] ABSTRACT

An irradiator, for containment and exposure of a radiation source, that is self-contained and portable. The irradiator provides radiation shielding, physical strength and thermal dissipation to allow transport of a radiation source carried therein without further containment or shielding. A radiator frame carrying a radiation source is lowered below the container for exposure to particularly adapt the device for tunnel irradiation of product from a position thereabove. The radiation preferably source is cesium-137 which provides medium energy gamma radiation adapted particularly for radiation processing and sterilizing of food products with minimal additional shielding requirements.

5 Claims, 3 Drawing Sheets

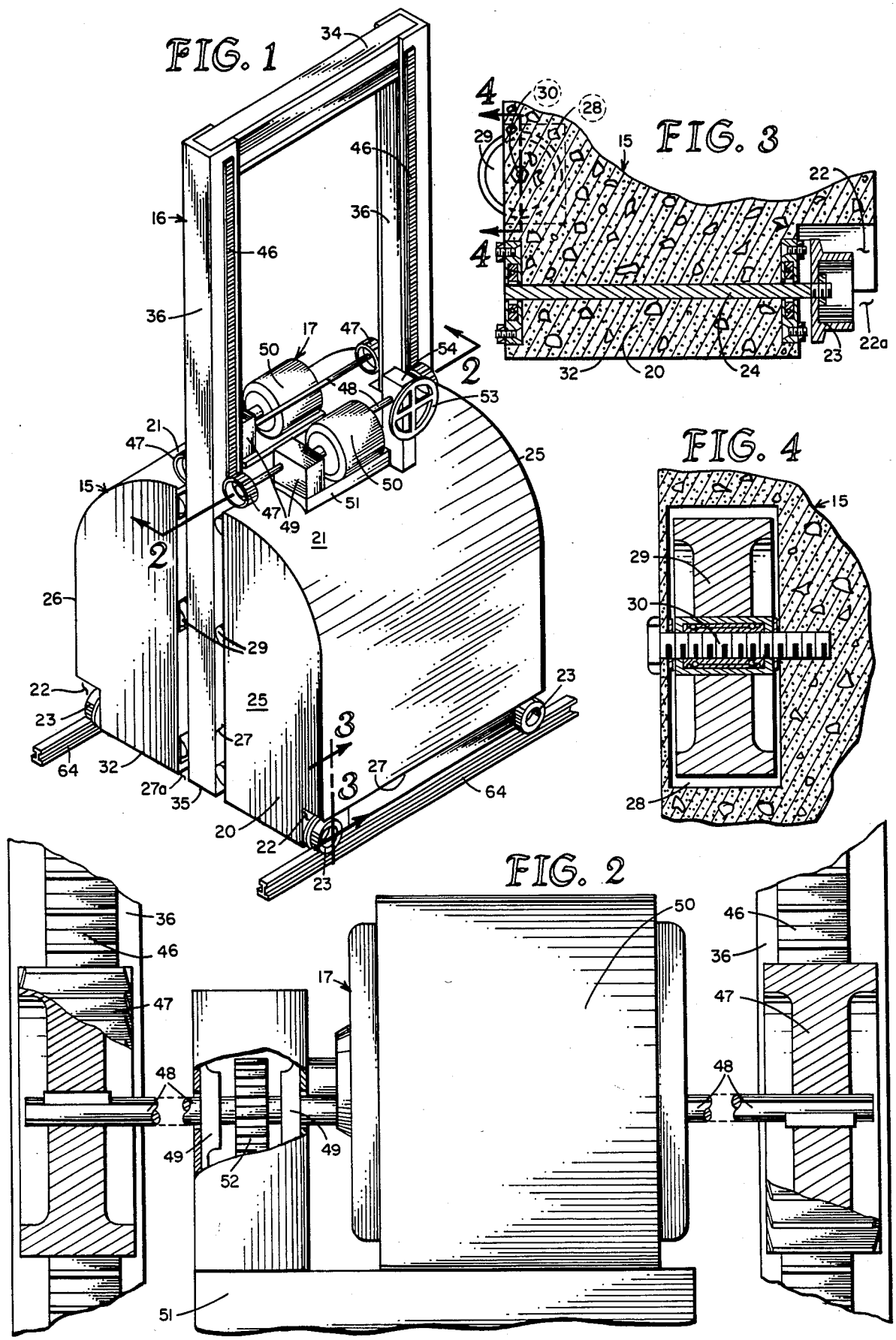

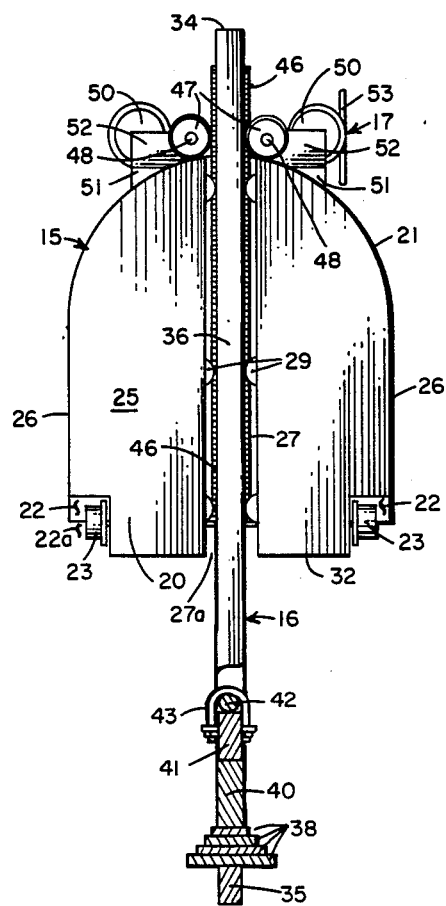
FIG. 5
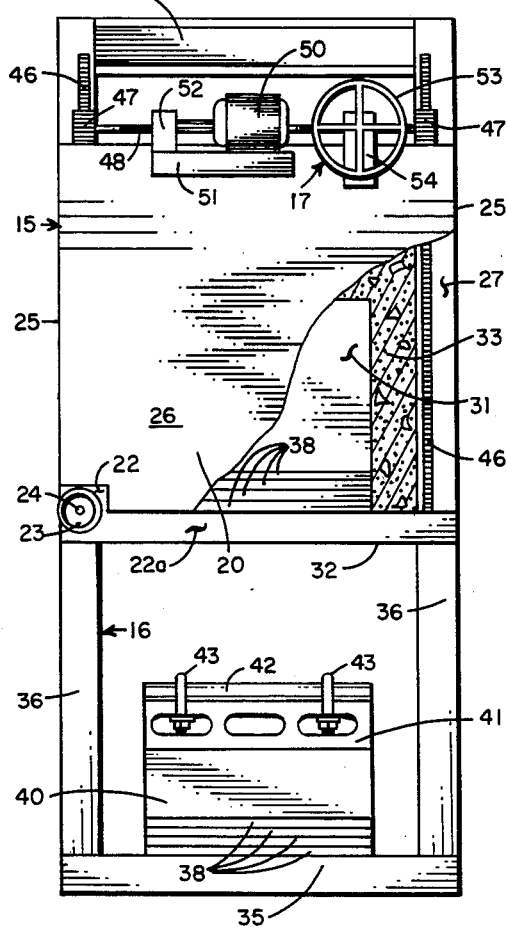
FIG. 6
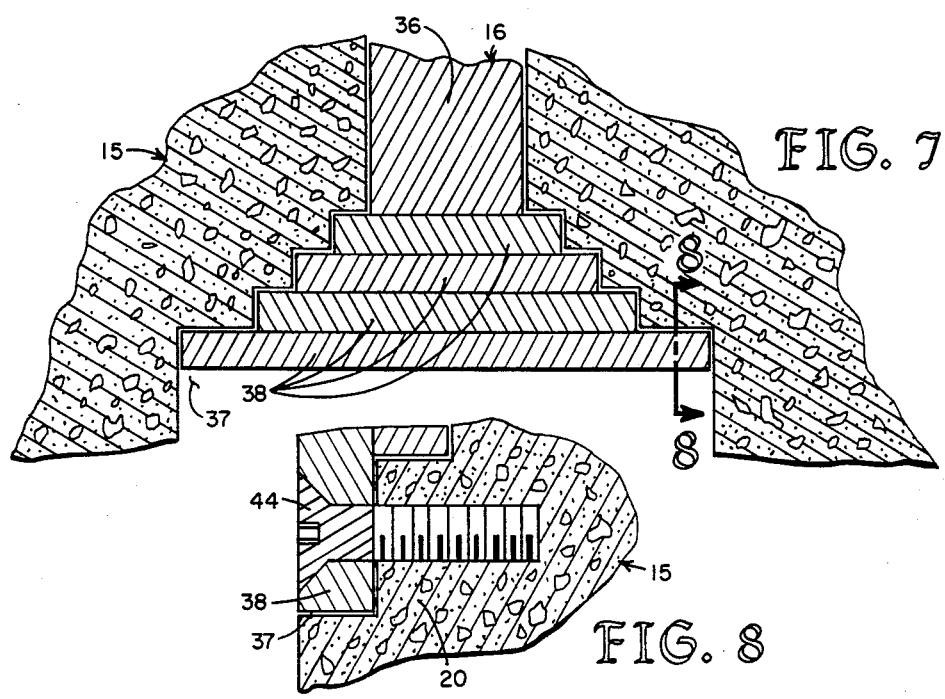
FIG. 7
FIG. 8

DRY STORAGE IRRADIATOR STRUCTURE

BACKGROUND OF INVENTION

1. Related Applications

There are no applications related hereto heretofore filed in this or any foreign country.

2. Field of Invention

Our invention relates to self-contained, medium energy gamma irradiators and more particularly to such an irradiator that is portable, self-contained, and moves a radiation source vertically downwardly for use.

3. Description of Prior Art

The irradiation of food for preservation or other purposes has been known for some time. Commercial irradiation started at least as early as the 1950's and research on the subject throughout the world has become increasingly intensive to the present day. A large portion of the technology in this field has developed in the recent past and outside the United States because of a much less restrictive environment elsewhere than in the United States, where radiation has largely been looked upon by governmental authorities as an adulteration of food by additives and not as a beneficial or conservation process.

Attitudes have changed with the passage of time and the pressure of economics, however, and radiation is coming to be used in more and various food processes such as sterilization or pasteurization without raising the temperature of sealed food packs, improving processability of foods such as by requiring shorter cooking time, initiation and acceleration of maturity as in the aging of cognac, retarding food ripening, pest control as with papayas, inhibition of germination as in potatoes and onions, and in combination with other processes common to the food processing arts to enhance the activity and results of such other processes. The potential of such applications presents an almost boundless horizon.

Unfortunately, the apparatus for irradiation of food stuffs has remained in the same primitive state as the process itself. Most known apparatus has been extremely expensive because not only of the regulatory environment in which it exists but also by reason of lack of research, knowledge and appropriate engineering ingenuity. The instant invention seeks to provide a new and novel member of the class of commercial irradiators for food stuffs which overcomes many of the disadvantages of those devices as heretofore known.

Commonly in the past, irradiation of food has been carried out by cobalt-60 energy sources which produce gamma radiation of relatively high energy. This source probably gained its popularity because of its availability. In the recent past, however, cesium-137, which occurs as a byproduct of uranium fission in nuclear power reactors, has become more available and provides a somewhat lower energy source of gamma radiation. The economics of the two materials are substantially similar, as in general most radiation sources are priced proportionally to their intensity of radiation and though that intensity is higher with cobalt-60, that material's life span is also less, approximately 5.2 years in half-life, while cesium-137 has a half-life of 30 years. The lower energy of the later radiation source, however, does not require such extensive shielding as the cobalt-60 source and allows a better and more efficient design for a portable irradiator of the type of the instant invention.

In general, known food irradiators have been massive installations with permanent or semi-permanent radiation sources to conform to the previously described philosophies and to some degree because of the dictates of the high energy radiation sources which they embodied. Our invention, in contra-distinction, provides a relatively small portable device that is entirely self-contained. This offers substantial economic advantage over the prior art devices in that our invention may be used as its own transport container without further shielding or modification. This allows the ready use of one or more radiation sources in a particular project for a limited period of time with subsequent removal and transport between various irradiation sites so that one or a group of irradiators may be used at one site for a particular crop or product and thereafter may be readily moved to another site for processing of other material as desired. This self-contained, transportable feature of our irradiator also materially aids the loading and unloading of various radiation sources from the device when this should be necessary.

The design of our irradiator also allows its convenient use at various locations with seasonal crops. With massive irradiators of the prior art, if such a facility were to be used for more than one product, a secondary product commonly would have to be transported to the facility. With our invention, since the irradiator unit itself is relatively small and self-contained, it may be quite conveniently moved at different times to various local processing facilities to process materials then and there available. This materially lowers the overall cost of processing as it minimizes transportation requirements and maximizes the period of facility usage.

Our invention, again, uses the lower energy source of cesium-137 as opposed to the higher energy cobalt-60, commonly used heretofore in most irradiation facilities. Though the economics of the two materials are about the same, the lower energy material provides quite sufficient energy for food irradiation but yet requires less shielding to allow use of a smaller, more conveniently transportable container. The cesium-137 is generally available and merchandised.

A further advantage accrues from the portable and transportable nature of our irradiator. The device may be transported to an equipped facility for radiation source loading to avoid the hazardous operations of loading and the transportation of radiation sources.

Our irradiator body is configured to expose a radiation element for use by moving that element downwardly, and this allows a radiation facility configuration such that our device is positioned above a chamber wherein radiation takes place. This configuration allows the use of tunnel-type irradiation facilities which are most convenient and cost effective, as they allow use of the ground as a shielding element and do not require the use of water, either as a shielding element or a storage medium. This structural feature materially lessens the overall cost of irradiation facilities whereat our irradiator is to be used, so that a plurality of such facilities may be economically provided for use at different times in different locations, whereas with the larger, more massive and costly facilities of the prior art this was not possible.

The small size of our irradiator and the configuration of the facility in which it is used are both conducive to allowing the use of a plurality of irradiators at one site, if required. This feature also allows additional irradiators to be added at a facility to speed up processing at peak periods. The prior art irradiators generally did not allow this type of activity as their radiation sources were relatively fixed and generally could not be well or economically modified to add additional radiators, either because of the difficulty in providing them, the problems that would arise from shielding, the physical limitations of the space in the facility itself or similar causes.

Our irradiator provides a small, modular unit that, by its design, is of relatively low cost as compared to prior apparatus. Similarly the facility in which irradiation is had is so positioned and configured as to provide a relatively low cost per unit of product handled, as compared with prior facilities. These two elements combine to allow product irradiation at a substantially lower cost than has heretofore been had. Our irradiator also provides at least a substantial part of its on-site shielding and thus lowers the shielding requirements of a facility at which it is used.

Our invention resides not in any single structural feature or function per se, but rather in the synergistic combination of all features and the functions necessarily flowing therefrom to distinguish it from the prior art, either individually or in any combination of its elements.

SUMMARY OF INVENTION

Our invention generally provides a dense concrete and steel body defining an internal radiator chamber and medial vertical slots carrying an elongate radiator frame for vertical motion. The body is provided with wheels for locomotion. The radiator frame carries at least one radiation source in its lower medial part in such position that when the frame be raised, the radiation source is positioned in the medial radiator chamber defined in the body and the lower portion of the radiator frame covers the lower orifice of that chamber.

The radiation source is cesium-137 in elongate tubular configuration positioned to extend horizontally in the medial part of the radiator frame. The radiation source is relatively free to radiate except in a vertical direction through the radiator frame. The lower portion of the radiator frame carries a labyrinth plug that fits within a corresponding orifice in the frame channel in the lower portion of the body to prevent exit of radiation therepast when the plug be in place. The radiator frame is vertically moved by mechanical linkage powered by two independent motors and has a third overriding emergency system which can move it manually.

Appropriate controls are provided for the mechanical systems to regulate motion of the body relative to a supporting surface and of the radiation frame relative to the body.

An irradiation facility in which our radiator is to operate provides an elongate tunnel-like chamber having peripheral shielding and an access orifice defined in a medial position in its top portion. Our irradiator body is maintained above this access orifice in a position allowing extension of the radiator frame therethrough. Appropriate shielding structures cover unused portions of the access slot and shield the peripheral area between irradiator body and the tunnel top. A conveyor system in the tunnel has four courses, one in each quadrant about the radiation source. Product generally is passed four times past the radiation source with a different edge of the product closest to the radiator in each pass so that radiation presented to a product will be substantially equal throughout its volume. Appropriate ancillary control structure regulates product positioning and conveyor function.

In creating such a device it is:

A principal object of our invention to provide a relatively small, low-cost, portable irradiator for food products.

A further object of our invention to provide such an irradiator that is self-contained and provides sufficient shielding to allow the irradiator to be transportable with radiators in place therein without other containment.

A further object of our invention to provide such an irradiator that is configured to lower a radiation source vertically downwardly to expose it for operation in a chamber beneath the irradiator body.

A still further object of our invention to provide such an irradiator that is fueled by cesium-137 to provide low-cost and efficient radiation but yet allow the particular shielding and configuration of our device.

A further object of our invention to irradiate product sequentially as it passes along four quadrantally arranged conveyor courses passing the radiation source so that the product is substantially uniformly irradiated about its periphery.

A still further object of our invention to provide such an irradiator that is removably associated with an irradiation facility so that one irradiator may be used in multiple facilities and multiple irradiators may be used in a single facility as occasion may require.

A still further object of our invention to provide such an irradiator and irradiation process that are of new and novel design, of rugged and durable nature, of simple and economic manufacture and otherwise well suited to the uses and purposes for which they are intended.

Other and further objects of our invention will appear from the following specification and accompanying drawings which form a part hereof. In carrying out the objects of our invention, however, it is to be understood that its essential features are susceptible of change in design and structural arrangement, with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of our irradiator body, with the radiator frame in raised position, showing its various parts, their relationship and configuration.

FIG. 2 is an enlarged partial, cut-away view through the driving mechanism of the irradiator of FIG. 1, taken on a line such as 2—2 thereon in the direction shown by the arrows.

FIG. 3 is a partial cross-sectional view through the irradiator body of FIG. 1, taken on line 3—3 thereon, in the direction indicated by the arrows, to show the details of guide wheel and transit wheel structures.

FIG. 4 is an enlarged cross-sectional view of the guide wheel structure of FIG. 3, taken on the line 4—4 thereon in the direction indicated by the arrows.

FIG. 5 is an orthographic end view of our irradiator, with the radiator frame in a lowered position.

FIG. 6 is an orthographic side view of the same structure as illustrated in FIG. 5, showing its details from this aspect.

FIG. 7 is an enlarged cross-sectional view through the labyrinth structure of the radiator frame and irradiator body.

FIG. 8 is a vertical cross-sectional view through the lower outer portion of the labyrinth structure, taken on the line 8—8 of FIG. 7, to show particularly the method of fastening the radiator frame to the body structure for transportation.

DESCRIPTION OF THE PREFERRED EMBODIMENT

Figure 9:
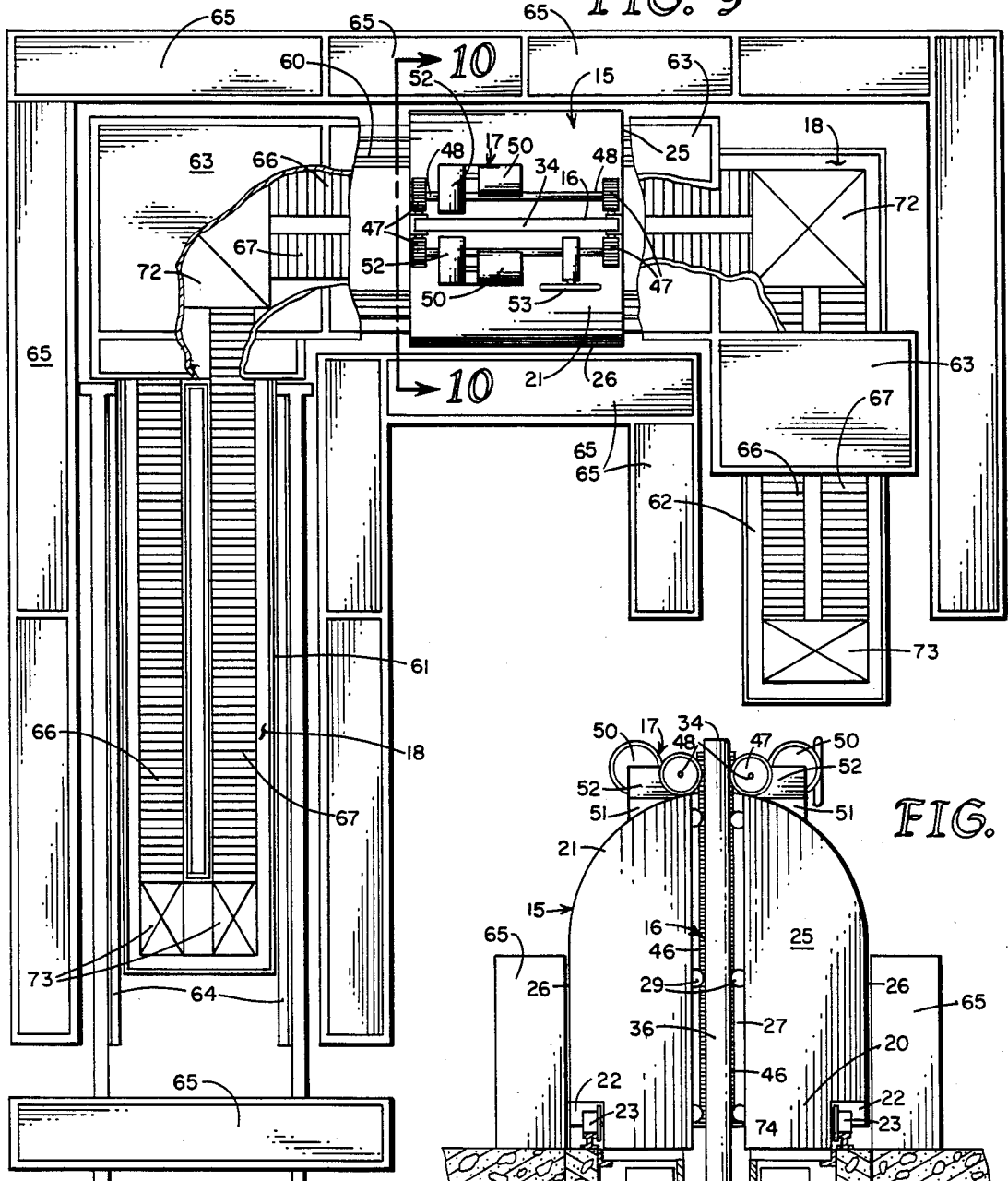
FIG. 9 is an orthographic vertical or plan view of an irradiator tunnel structure whereat our irradiator may be used.

Our invention generally comprises irradiator body 15 carrying radiator frame 16 in medial slots with moving mechanism 17 communicating therebetween for adjustable vertical motion of the radiator frame. The irradiator is associated with tunnel-type irradiation chamber 18 wherein product 19 is irradiated.

Irradiator body 15, or 'pig' as it is often called, has a rectilinear base portion 20 and upper partially cylindrical top portion 21. The base in its lower lateral parts defines wheel wells 22 carrying flanged wheels 23 journaled on axles 24 supported by the body. Wheels 23 are supported on rails and are mounted in a vertical position such that their flanges do not extend below base 20 for their structural protection so as to require definition of wheel channels 22a between lateral wheel wells for operability. Similar body ends 25 are planar and sides 26 are planar in their lower portions and curvilinear in their upper portions to define top 21.

Each body end 22 defines a medially positioned, vertical radiator frame channel 27 wherein a radiator frame is supported for vertical motion. The body bottom defines a similar horizontal radiator channel 27a, extending between the lower portions of the vertical irradiator frame channels, to receive the bottom of the radiator frame. As seen in FIG. 3, the body, adjacent each vertical radiator frame channel, defines a plurality of paired opposed guide roller wells 28 wherein guide rollers 29 are journaled on jack axles 30 carried by the body. Opposed pairs of guide rollers are sized and positioned to rollably receive and support a radiator frame therebetween and the roller wells are configured to allow rotatable motion of those guide rollers therein. The spacing between guide rollers will accommodate a radiator frame normally about 2 and ½ inch thick.

Radiator source cavity 31 is defined in the lower medial portion of the body 15 extending upwardly therein from bottom 32. The exact size and configuration of this cavity is dictated by configuration of the radiator element and its supporting structure so that they may be received therein. Normally, the cavity will be configured somewhat as illustrated, with some portion 33 of the body between each end of the radiator source cavity and the adjacent frame channel 27 and a labyrinth structure 39 in the lower orifice of the radiator channel to provide appropriate orifice closure.

Radiator frame 16 provides a rectilinear structure peripherally defined by similar top 34 and bottom 35 interconnected in spaced parallel relationship by similar parallel side elements 36. These elements have the same thickness such as to adapt them to be rollably supported between paired opposed guide rollers 29 of the body structure and they have a width generally somewhat greater than their thickness to provide adequate strength, rigidity and appropriate shielding where required. The width of side elements 36 and their spacial configuration is such as to allow radiator frame 16 to be carried for vertical motion with its two side elements in paired opposed frame channels 27 of the body. Bottom element 35 fits within frame channel 27a defined in the lower portion of base 20 of the body when the frame element is in uppermost position.

Bottom element 35 of the radiator frame on its upper surface provides structure to support a radiation source. A plurality of horizontally orientated labyrinth plates 38, all of similar shape, but each having a smaller size than the plate immediately therebelow, are mechanically interconnected to the upper surface of bottom frame member 35. These plates are so arrayed and configured as to fit, when the radiator frame be in uppermost position, within labyrinth structure 39 defined in body 15 at the lower medial portion of the radiator chamber. This provides a radiation seal for the radiator source when it be within radiator cavity 31 defined in the body. This labyrinth structure carried by the radiator frame may be releasably fastened in its containment chamber defined in the body by bolts extending therebetween as shown particularly in FIG. 8. This fastening is particularly useful for transportation of the device.

Radiator source cavity plug 40 is carried by the uppermost labyrinth plate to extend a spaced distance thereabove to there carry radiator source mount 41. The source mount releasably carries elongate radiation source 42 on its upper surface. All of this radiator mounting structure is so dimensioned and configured as to fit within radiator source cavity 31 defined in body 15 when the radiator frame be in an upwardmost position. In that position, bottom 35 of the radiator plate will fit within bottom cavity 37 defined therefore in base 20 so that no portion of the radiator frame will extend below body 15 when it be in uppermost position. If desired, a plurality of radiation may be supported by the cavity plug.

Radiation source 42, as commonly available in present day commerce, is configured as an elongate cylinder. With such structure the source may conveniently be positionally maintained by brackets 43 mechanically fastened to source mount 41 by bolting or similar mechanical means. Source mount 41 is configured, as illustrated, with an arch and beam-type construction as known in the present day radiation arts for mounting radiator sources to avoid warpage and other geometrical disfiguration because of the physical environs. Other known methods of source mounting may be effectively used, if desired.

Commonly, body element 15, aside from its attached mechanical apparatus, will be formed from concrete, either of an ordinary type or a type filled with shielding material, such as metal in various forms. This type of material appropriate for shielding radiators is well known in the present day nuclear arts and most of the known materials are adaptable for the purposes of our invention, if they possess appropriate physical strength and rigidity. Commonly the concrete body will be reinforced with tensile elements such as reinforcing steel to provide appropriate strength. If desired or necessary, steel plate or other thermally conductive material may be incorporated in the body to dissipate heat generated by the radiator in compliance with present day governmental regulations. The elements of the radiation frame preferably are formed of metal, normally steel of some type, to provide appropriate shielding where required of that element and to provide the appropriate strength and rigidity required for operation of our irradiator.

Moving mechanism 17 provides mechanical means to vertically move radiator frame 16 relative to body 15. In the form illustrated, the upper portion of each side element 36 of the radiator frame defines geared racks 46 on each side of each element. These opposed racks on the same side of the frame are meshedly engaged by paired opposed pinions 47 carried on common pinion shaft 48 extending therebetween and journaled in bearing structure 49 on the upper surface of body 15. Similar structure is provided on each side of the radiator frame. Shafts 48 are each powered for rotation by paired opposed motors 50 supported on motor mounts 51 structurally carried on the top portion oi body 15 and interconnected with the pinion shafts by gear structures 52 to provide a relatively slow lineal motion of the radiator frame responsive to motor motion. Motors 50 are preferably electrically driven and are controlled by standard control devices (not shown) to allow both motors to simultaneously move the radiator frame vertically or allow either motor to independently move it.

Hand wheel 53 journaled in mounting bracket 54 rotates jack-shaft 55 which irrotatably carries in its end part bevel gear 56 which meshedly communicates with similar bevel gear 57 irrotatably carried on pinion shaft 48 to allow that shaft to be rotated by the hand wheel to thusly provide a manual means of raising and lowering radiator frame 16, should both mechanized systems fail. The combination of the three moving mechanisms provides three separate and independent means of vertically moving the radiator frame, with each operating through the rack and pinion drive to provide positive mechanical interconnection. The control mechanism of motors 50 may provide for manually limiting the upward and downward positions of the radiator frame or, if desired, might embody position sensitive switches, or the like, (not shown) to automatically limit that positioning. Commonly, if position sensitive switches are used, manual over-ride means should be provided for duplicative safety.

Obviously the particular mechanical method of vertically moving the radiator frame is not the only method of so doing, and other mechanisms accomplishing the required functions may well be used with our invention. Similarly other known means than the radiator frame for moving the radiator plug may well be used and remain within the ambit of our invention.

The particular radiation source 42 for which our invention is especially designed is cesium-137 which is presently obtainable in the United States from government sources as a by-product of atomic reactors. The material has a half-life of 30 years and is generally made available in an encapsulating hollow stainless steel tube, normally about two inches in diameter and 24 inches long. Our invention is configured to carry four such, radiation sources in spaced, end-to-end relationship to provide an appropriate energy source for irradiation of ordinary agricultural and food products. Obviously various other radiation sources and various other configurations of those sources might be adapted for use with our invention by modification of configurations and dimensions, especially those relating to the source cavity and source support structure. Normally, however, if cobalt-60 sources are used with our irradiator, the body structure would have to have substantial additional shielding and normally would have to be substantially more massive.

The use of our irradiator may be readily understood from the foregoing specification of its structure.

An irradiator is formed according to the specifications and is loaded with a radiation source as indicated. Commonly, to accomplish this, the irradiator will be manufactured and shipped to a facility where a radiation source is to be installed. The radiation source will then be installed at the facility and our invention will be used as a shielding means to transport the whole unit back to its place of use. The loading operation of the radiation source is readily accomplished from beneath the device by lowering the radiation frame, installing the radiation source in place on the upper surface of the source mount and thereafter moving the radiator frame upwardly to its uppermost position to seal it within the radiator chamber defined in the body of our invention. The irradiator may then be transported in ordinary commercial fashion.

Figure 10:
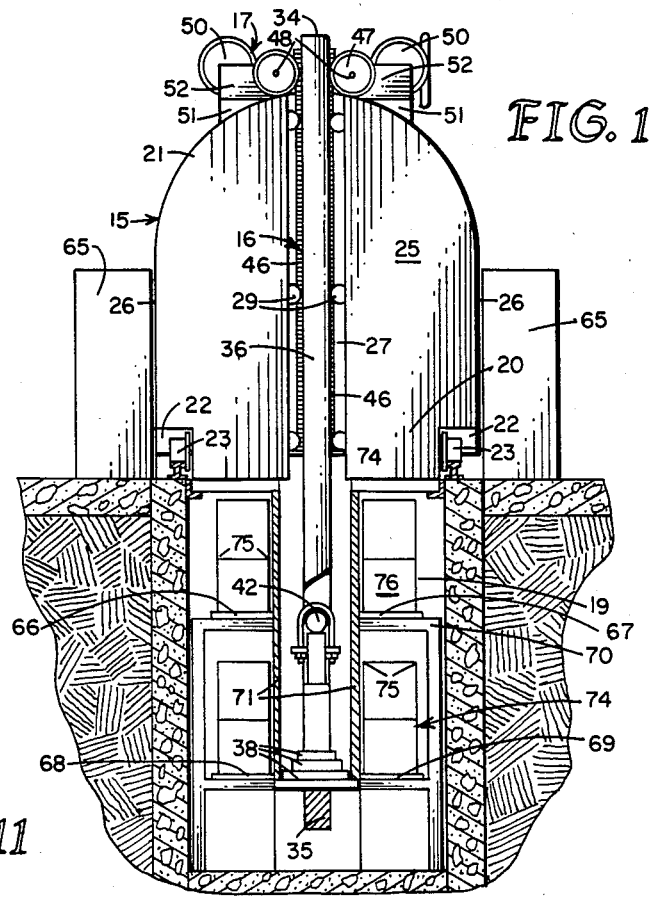
FIG. 10 is an orthographic vertical cross-sectional view of our irradiator body in operative position over the irradiation chamber illustrated in FIG. 9.
Figure 11:
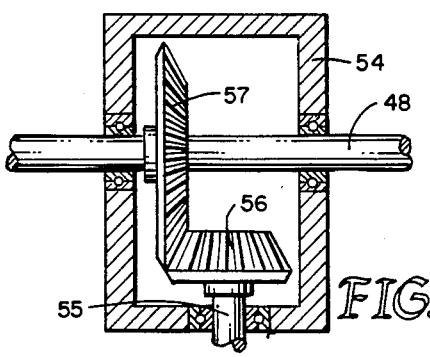

A typical facility whereat our invention may be used is shown in the illustrations of FIGS. 9 and 10. Here a "U" shaped tunnel comprising medial portion 60, longer leg 61 and shorter leg 62, is defined in the earth by peripheral walls and covered with a plurality of concrete top slabs 60 to provide an elongate chamber in the earth wherein irradiation of the desired nature may be carried out with adequate shielding to protect things external thereto, within limits of safety and as required by governmental regulations applicable to the operation. Commonly, the tunnel walls are defined by shielding concrete surfaces and top slabs 63 may embody additional shielding materials, if desired, as known in the prior art. The "U" shaped tunnel design is desirable to aid shielding of the device, and particularly to aid in preventing radiation from moving in three dimensional right angles to contaminate the area of vertical input and output at the ends of the legs of the tunnel. Undoubtedly other configurations of radiation chambers might be used with our irradiator, as they obviously are no essential part of it, but this particular tunnel configuration disclosed has heretofore been found quite efficient and useful.

The width of the radiation tunnel, at the top at least, is somewhat less than the width of the body of our irradiator so that rails 64 may be positioned and maintained in parallel opposed array along the upper surface of the tunnel to support flanged wheels 25 of our irradiator. The tunnel, however, must be wide enough to support courses of conveyors, preferably parallel courses on each side of the radiation frame, when that frame be lowered with the radiator in an exposed horizontally medial position in the tunnel. The tunnel also must have sufficient depth to allow the radiator frame to be lowered so that its radiation source is in a vertically medial position in the tunnel, whereat it might irradiate two vertically spaced layers of product within the tunnel. At the tunnel position where our invention is to be used, there normally will be constructed two spaced upstanding buttress walls 65, of length as least as great as the length of body 15 of the irradiator and a height extending some distance above the wheel channels, normally about half the height of the irradiator body, to aid in further shielding the sides of our irradiator when it be positioned for use. Similar movable walls or other shields (not shown) might be placed at each end of the body, if desired or necessary, during the irradiation process.

The "U" shaped tunnel provides a conveyor structure having four spaced courses for moving product within the tunnel, as illustrated particularly in FIGS. 9 and 10. This conveyor structure is of a general type heretofore known in the product handling arts and therefore is not described in any particular structural detail. It provides conveyor courses arrayed, as illustrated, with two vertically spaced courses at a horizontally spaced distance on each side of the medial vertical plane of the tunnel. The conveyor courses are numbered respectively 66, 67, 68 and 69 and are supported on framework 70 within the tunnel and commonly partitioned from the radiation source by medial septa 71 to assure that misaligned product or other similar accidental happening does not damage the radiation source. The corners of each conveyor are provided with corner transfer structure 72, again of the type heretofore known in the conveyor arts, to move product through a right angled turn. Product elevators 73 are provided at each end of the conveyor structure, in the end parts of the legs of the "U" shaped tunnel, to raise and lower product into carriage position on the respective conveyors. The whole conveyor system is provided with automatic controls (not shown) to accomplish the motions and functions indicated. These controls and conveyor structures again are known in the material handling arts and have heretofore there been used.

To use our irradiator with such a tunnel structure, the radiator is positioned on supporting rails 64 and moved therealong, manually or by external mechanical means, to the appropriate position along tunnel body 60 where irradiation is to be had. The top slab covering such use position is removed from that spot and the body of the irradiator is positioned so that the radiator frame may be moved vertically downward. Appropriate peripheral shielding is then placed if required. The frame is then lowered to a position where the radiation source is located vertically between conveyor courses and the device is then ready for operation.

Product 19, shown in the illustration of FIG. 10, is contained in box-like containers 74, stacked two high on each conveyor course and in reasonable end to end adjacency to provide maximum product capacity. Edges 75 between each adjacent pair of sides of the containers are passed successively past the radiator by the conveyors. To accomplish this, the four conveyor courses inter-communicate by appropriate mechanical linkage to change product position relative to the conveyor and radiation source during each of four passes past that radiation source. On conveyor course 66, edge 75a is closest to the irradiator; on course 67, edge 75b is closest, on course 68, edge 75c is closest and on course 69, edge 75d is closest. With this pattern of passage of product past the radiator, the product in any particular container is reasonably symmetrically irradiated about its periphery and that irradiation is about as uniform as can be accomplished with product in rectilinear containers.

The time of passage of product past the radiation source may be regulated by controlling the speed of the conveyors and, to some degree, by regulating their positioning relative to the radiation source or vice versa. The radiation requirements for different products and for different purposes may vary widely and must be regulated and determined empirically or by methods heretofore known and used in the irradiation arts to accomplish the particular object desired. Obviously, radiation from a source may not be increased above the energy of that source, but it may be decreased by positioning of product at a greater distance or by attenuation of the source by shielding or otherwise, again, as heretofore known.

The particular facility illustrated has been adapted especially for the irradiation of papayas in box containers to kill pests that may be associated with them and to accelerate their ripening. The normal dose of about 26 K-rads is required for such irradiation and is accomplished in boxes of about 14 inch cubic dimension with the closest box edge at a distance of approximately 10 inches from the radiation source and with conveyor speeds of about 1,591 inches per hour. These figures will allow irradiation of approximately 117 boxes per hour in a single stacked array and approximately 173 boxes per hour in a double stacked array on conveyor courses as described. These calculations assume a cesium-137 source with an activity of approximately a 20 megarad equivalent. Obviously, these numerical parameters might be widely varied to accomplish irradiation of different products at different dosages and for different purposes.

It should be particularly noted that although our irradiator is described for use with the particular radiation source cesium-137 in a configuration as presently provided by suppliers, the device well may be used with other radiation sources in other configurations. Similarly, although the particular embodiment described is adapted for use in irradiating papayas, the relevant parameters and especially the time and method of passage of product past the radiator and its distance therefrom, may be varied to irradiate many other agricultural and food products for sterilization from pest, microbes or insects and for other purposes such as aging, ripening, or the like.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and What we claim is:

1. A transportable, self-contained irradiator comprising, in combination:
    a body, formed of rigid radiation shielding material,
        said body having a flat base and means to aid locomotion over an underlying supportative surrface, and
        defining an internal radiator chamber extending upwardly into the body from an external orifice in the flat base, said orifice accepting a radiation source cavity type plug to aid in preventing passage of radiation therethrough,
    said radiator source cavity plug having a labyrinth structure in its lower portion to sealably interfit with labyrinth structure of the external orifice of the internal radiator chamber, said cavity plug having
    support means extending upwardly from the labyrinth structure to releasably carry at least one radiation source, said support means fitting within the radiator chamber defined in the irradiator body; and
    mechanical means of moving the said cavity plug from a shielded position wherein it is completely contained within the radiation source cavity downwardly to a position wherein the radiation source is exposed at a spaced distance below the flat base of the irradiator body.

2. A portable, self-contained irradiator comprising, in combination:
- a body with a substantially rectilinear base formed of rigid radiation shielding material said body having similar opposed vertically orientated radiator frame channels defined in opposed ends,
- a bottom radiator frame channel defined in the bottom of the body and extending between the lower portions of the vertically orientated radiator frame channels; and
- an internal radiator chamber defined in the body and extending upwardly therein from the base;
- a peripherally defined radiator frame having vertical sides carried for vertical motion in said vertically oriented radiator frame channels defined in the body, said radiator frame carrying in its lower portion support means supporting a radiation source at a spaced distance thereabove and a plug to sealably interfit in a radiator chamber orifice defined in the bottom of the body, said support means and radiation source fitting within the radiator chamber of the body and being movable vertically downwardly a spaced distance therebelow responsive to vertical motion of the radiator frame; and
- means for adjustably moving the radiator frame vertically relative to the body from an upwardmost position whereat the radiation source is carried within the radiator chamber defined in the body to a lower position whereat the radiation source is exposed at a spaced distance below the body.

3. The invention of claim 2 further characterized by the means for moving the radiator frame relative to the body including:
- similar racks supported on each side element of the radiator frame with spaced pinions meshedly engaged therewith and irrotatably carried on a common shaft extending therebetween, said shaft supported on said body for rotatable motion and having associated motor means and manual means for rotating said shaft to turn said pinions and wherein
- the radiation source carried by the radiator frame comprises cesium-137 carried within at least one elongate tube oriented horizontally.

4. A self-contained portable irradiator, comprising in combination:
- a rigid body having a planar rectilinear base with similar opposed sides and ends extending upwardly therefrom, said body defining medially positioned, vertically oriented radiator frame channels in two opposed ends, a bottom radiator frame channel in the base extending between the lower portions of the vertical radiator frame channels, and a radiator chamber extending upwardly from the base a spaced distance within the body, said vertically oriented radiation frame channels having a plurality of opposed rollers to rollably receive a radiator frame therebetween fro vertical motion in said channels;
- a radiator frame peripherally defined by similar top and bottom elements joined in spaced parallel relationship by similar side elements, having thickness to be rollably received between frame channel rollers, said irradiator frame being carried in said vertically oriented radiator frame channels for vertical motion and having support means suporting a radiation source at a spaced distance above the bottom element and means to seal the radiator chamber when the radiator frame is in an uppermost position relative to the body with the radiation source carried in the radiator chamber; and
- means of adjustably vertically moving the radiator frame relative to the body including elongate racks carried on both sides of the upper portion of elongate side elements of the radiator frame, each rack on the same side of the radiator frame being meshedly engaged with spaced pinions gears irrotatably carried on common shaft journaled on the upper portion of the body, each said shaft mechanically interconnected with mechanical and manual means for causing rotation thereof to move the radiator frame vertically relative to the body.

5. The invention of claim 4 further characterized by:
- the radiator source comprising cesium-137 comprising at least one elongate tube horizontally oriented relative to the body, and
- the body being formed of metal embedded in cementuous material to shield radiation of the radiator and act as a container therefore when the radiator frame is in an uppermost position.

* * * * *